(12) United States Patent
Maurer et al.

(10) Patent No.: US 11,933,410 B2
(45) Date of Patent: Mar. 19, 2024

(54) METHOD FOR MANUFACTURING A MAIN BODY OF A VALVE HOUSING FOR A HYDRAULIC CONTROL VALVE, AND VALVE HOUSING HAVING THE MAIN BODY

(71) Applicant: ZF Friedrichshafen AG, Friedrichshafen (DE)

(72) Inventors: Patrick Maurer, Heusweiler (DE); Herbert Scholl, Lebach-Steinbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 532 days.

(21) Appl. No.: 16/972,295

(22) PCT Filed: Jun. 3, 2019

(86) PCT No.: PCT/EP2019/064289
§ 371 (c)(1),
(2) Date: Dec. 4, 2020

(87) PCT Pub. No.: WO2019/233925
PCT Pub. Date: Dec. 12, 2019

(65) Prior Publication Data
US 2021/0131574 A1    May 6, 2021

(30) Foreign Application Priority Data
Jun. 5, 2018   (DE) ............... 10 2018 208 812.8

(51) Int. Cl.
*F16K 27/04* (2006.01)
*F16K 11/07* (2006.01)
*B23K 26/38* (2014.01)

(52) U.S. Cl.
CPC ........ *F16K 11/0716* (2013.01); *F16K 27/041* (2013.01); *B23K 26/38* (2013.01)

(58) Field of Classification Search
CPC .............................. F16K 27/041; B23K 26/38
See application file for complete search history.

(56) References Cited

U.S. PATENT DOCUMENTS

| | | | |
|---|---|---|---|
| 3,885,284 A * | 5/1975 | Clippard, III ....... | F16K 27/0263 29/890.128 |
| 5,235,746 A | 8/1993 | Leonard | |
| 6,349,743 B1 | 2/2002 | Staiger et al. | |
| 2005/0121637 A1* | 6/2005 | Adams ..................... | F01L 9/10 251/129.15 |

(Continued)

FOREIGN PATENT DOCUMENTS

| DE | 102015223952 A1 | 6/2017 |
|---|---|---|
| GB | 829785 A | 3/1960 |

OTHER PUBLICATIONS

International Search Report (English Translation) PCT/EP2019/064289, dated Aug. 14, 2019. (2 pages).

*Primary Examiner* — Kelsey E Cary
(74) *Attorney, Agent, or Firm* — Dority & Manning, P.A.

(57) ABSTRACT

A method for producing a base body of a valve housing for a hydraulic control valve includes machining a front-side section of a control edge into an unmachined base body for the base body with a cutting process in a front-side machining step. In the cutting process, a cutting tool is guided from a coupling side through a machining valve pocket to the front-side section of the control edge.

11 Claims, 6 Drawing Sheets

(56) References Cited

U.S. PATENT DOCUMENTS

| | | | |
|---|---|---|---|
| 2007/0175529 A1* | 8/2007 | Wang | F15B 13/0405 |
| | | | 137/625.65 |
| 2015/0209916 A1* | 7/2015 | Ozaki | F16K 27/041 |
| | | | 29/890.132 |
| 2016/0123461 A1* | 5/2016 | Eber | F16H 61/0276 |
| | | | 74/473.11 |
| 2018/0204751 A1* | 7/2018 | Gallagher | H01L 21/67366 |

* cited by examiner

METHOD FOR MANUFACTURING A MAIN BODY OF A VALVE HOUSING FOR A HYDRAULIC CONTROL VALVE, AND VALVE HOUSING HAVING THE MAIN BODY

CROSS-REFERENCE TO RELATED APPLICATIONS

The present application is related and has right of priority to German Patent Application No. 10 2018 208 812.8 filed on Jun. 5, 2018 and to WO2019/233925 filed on Jun. 3, 2019, both of which are incorporated by reference in their entirety for all purposes.

FIELD OF THE INVENTION

The invention relates generally to a method for producing a base body of a valve housing for a hydraulic control valve. Moreover, the invention relates generally to a valve housing having the base body.

BACKGROUND

Valve housings for hydraulic control unit valves often include a plurality of spools, wherein each of the spools penetrates a certain number of valve pockets and, depending on the axial position of the spool, can open and close fluidic connections. The valve housings are often designed as pressure die cast housings and, therefore, are cost-effectively manufacturable, in particular in large-scale production. However, the functional surfaces between the spools and the actual valve housing must be manufactured with a manufacturing accuracy that cannot be achieved via a pressure die casting. Therefore, the functional surfaces regularly require a re-working or a finishing.

DE 10 2015 223 952 A1, which is probably the closest prior art, describes a switching valve for switching coolant and lubricant circuits, which is utilized, for example, for controlling the lubricant and coolant circuits of sub-transmissions of a dual clutch transmission with coolant and/or lubricant. This known switching valve includes a valve housing having a valve spool chamber designed as a blind hole, in which a valve spool is axially movably mounted. The ports are designed in the shape of valve pockets, which extend transversely to the valve spool chamber and/or to the blind hole. The lateral faces of the valve pockets are designed as slopes, which function as drafts during the casting manufacture of the valve housing. The circumferential edges between the valve spool chamber and/or the blind hole and the lateral faces of the valve pockets act as control edges and, therefore, must be precisely machined. The manufacture of the valve housing from the prior art is therefore complex and includes many machining steps.

SUMMARY OF THE INVENTION

Example aspects of the invention provide a method, which allows for the simple manufacture of a valve housing of the relevant type, in particular also in large-scale production.

The subject matter of example aspects of the invention is therefore a method for producing a base body of a valve housing for a hydraulic control valve. In particular, the control valve is suitable and/or designed for a selector unit of an automatic transmission, in particular of a passenger car automatic transmission. Alternatively or additionally, the hydraulic control valve is provided for switching coolant and/or lubricant circuits. For example, with the aid of the hydraulic control valve, the control of the coolant and/or lubricant circuits of sub-transmissions of a dual clutch transmission with coolant and/or lube oil can take place.

The, in particular, machined base body includes a coupling side, in particular designed as a flange side, for coupling to a cover and/or a duct plate. The coupling side is preferably flat. In alternative embodiments, the coupling side can also be 3D-structured and/or contoured.

From the coupling side, a plurality of valve pockets is introduced into the base body, wherein the valve pockets can be designed as ports. In particular, the valve pockets are supplemented with the duct plate to form a hydraulic guidance and/or distribution system. The valve pockets are at least partially separated from each other by web sections, which form a part of the base body. In some cases, the valve pockets are closed off or delimited by web sections that form edge sections.

In the, in particular, machined base body, at least one valve spool chamber for a valve spool is introduced. Preferably, the base body includes multiple valve spool chambers as well as valve spools arranged therein. The valve spool chamber and/or the valve spool define/defines a longitudinal axis and/or spool direction. The valve spool is arranged in the valve spool chamber so as to be axially displaceable with respect to the longitudinal axis and/or spool direction. The valve pockets extend transversely, preferably perpendicularly to the valve spool chamber and/or to an appropriate passage opening and/or bore hole.

The valve spool chamber penetrates at least one web section, and so a web exit opening is formed in the web section. The web exit opening opens into one of the valve pockets. The valve pocket with the web exit opening is also referred to in the following as a machining valve pocket.

The web exit opening is preferably circular. The web exit opening is circumferentially delimited by a control edge, wherein the control edge is formed by a spool guiding section and a front-side section. The front-side section is an axial front-side section. The spool guiding section is designed, for example, as a hollow cylindrical section in the web section as part of the valve spool chamber. Alternatively, the spool guiding section can also be designed as a taper section, funnel section, etc. The control edge is formed, in particular, by the transition from the front-side section to the spool guiding section.

During the machining, the front-side section of the control edge is machined, in particular introduced, into an unmachined base body for the base body with the aid of a cutting process. This machining step is referred to as the front-side machining step.

In the cutting process, according to example aspects of the invention, the cutting tool is guided from the coupling side through the machining valve pocket to the front-side section of the control edge. A machining of the front-side section with the cutting tool therefore takes place through the machining valve pocket, wherein the cutting tool is inserted through an opening that is introduced into the coupling side. Alternatively or additionally, it is provided that an intermediate angle greater than forty-five degrees (45°), in particular greater than seventy-five degrees (75°), is formed between the spool direction and/or longitudinal axis and the cutting tool.

One consideration of the invention is that, due to the method according to example aspects of the invention, very small diameters can also be utilized for the valve spool chamber, since the bore hole for the valve spool chamber does not need to be designed for the accessibility with the cutting tool. Rather, the machining of the front-side section is carried out from another direction. Since the valve pockets must allow for the accessibility of the cutting tool, the valve pockets are also more usable for washing the produced base body and/or for the metrological inspection of the front-side section.

In a preferred example embodiment of the invention, the cutting process for the front-side machining step is a milling process, wherein a milling tool, in particular a milling cutter, is guided, as the cutting tool, from the coupling side through the machining valve pocket to the front-side section of the control edge, in particular to a machining spot for the front-side section of the control edge. Due to a milling-off of the front-side section and/or of an unmachined front-side section in order to produce the front-side section, a very high production quality can be achieved in one machining step.

In a further preferred example embodiment of the invention, the cutting process for the front-side machining step is a laser cutting process, wherein a laser beam, as the cutting tool, is guided from the coupling side through the machining valve pocket to the front-side section of the control edge, in particular to a machining spot for the front-side section of the control edge. Due to a laser machining of the front-side section or of an unmachined front-side section in order to produce the front-side section, a very rapid production can be implemented in one machining step.

In one possible refinement according to example aspects of the invention, the method has a method sequence, wherein a pre-machining is implemented with the aid of the milling process and a finishing or re-working is implemented with the aid of the laser cutting process, or in reverse order. In the method sequence, the specific advantages of the two cutting processes can be better utilized. In this way, it is possible, for example, to quickly remove material with the aid of the laser cutting process and to subsequently improve the surface of the front-side section with regard to the flatness and/or roughness with the aid of a milling operation.

In a preferred example implementation of the method, the unmachined base body has a web wall area in the machining valve pocket. The web wall area extends, in particular, from a base of the machining valve pocket to the top side of the machining valve pocket and/or coupling side of the base body. The web wall area includes an unmachined front-side section and a residual web wall section. In the front-side machining step, the front-side section is produced from the unmachined front-side section. It is provided that the unmachined front-side section protrudes over the residual web wall section in the axial direction with respect to the spool direction and/or longitudinal axis of the spool. In this implementation, only material in the area of the unmachined front-side section must be removed during the production of the front-side section. The residual web wall section can remain unmachined. Therefore, production costs are saved. Preferably, the transition from the unmachined front-side section to the residual web wall section is designed as an edge.

In a particularly preferred example embodiment of the invention, the unmachined base body is formed with the aid of a shaping process. In particular, the unmachined base body is manufactured with the aid of a casting process, in particular a pressure die casting. It is particularly preferred when the unmachined base body is an aluminum die cast body. In this example embodiment, the valve pockets with the unmachined front-side sections can already be formed into the unmachined base body. Moreover, the volume for the valve spool chamber can be already pre-formed or formed. In particular, in the unmachined base body, the valve pockets have been essentially fully formed and the valve spool chamber has been pre-formed, in particular with the aid of sliding members. It is preferred that the unmachined front-side section is designed as a draft section, in order to allow for a removal of the unmachined base body from the casting tool.

It is particularly preferred when the front-side section is situated in a radial plane with respect to the spool direction and/or longitudinal axis. It is therefore ensured that the same sealing conditions are established circumferentially at the transition from the valve spool to the control edge One further object relates to a valve housing, in particular of the type described above, with a base body, in particular of the type described above. Optionally, the valve housing includes the valve spool, wherein the valve spool is arranged in the valve spool chamber. The front-side section or the front-side sections is/are produced with the aid of the method according to example aspects of the invention. This is verifiable with respect to the finished product, in particular with respect to the fully machined base body, on the basis of characteristic traces of machining from the cutting process, in particular from the milling or the laser material processing.

It can be provided that the front-side section extends on an annular surface with a single ring width of less than three millimeters (3 mm), preferably less than one millimeter (1 mm), and/or more than one-half millimeter (0.5 mm) or at least covers this surface. Alternatively, the front-side section extends across a semicircular shape, which is lengthened in the direction of the base of the machining valve pocket.

BRIEF DESCRIPTION OF THE DRAWINGS

A preferred example embodiment of the invention is explained in greater detail in the following with reference to the drawings. The features shown in the figures of the drawing and/or explained in the following can be general features of the invention and can appropriately refine the invention, also independently of certain combinations of features.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
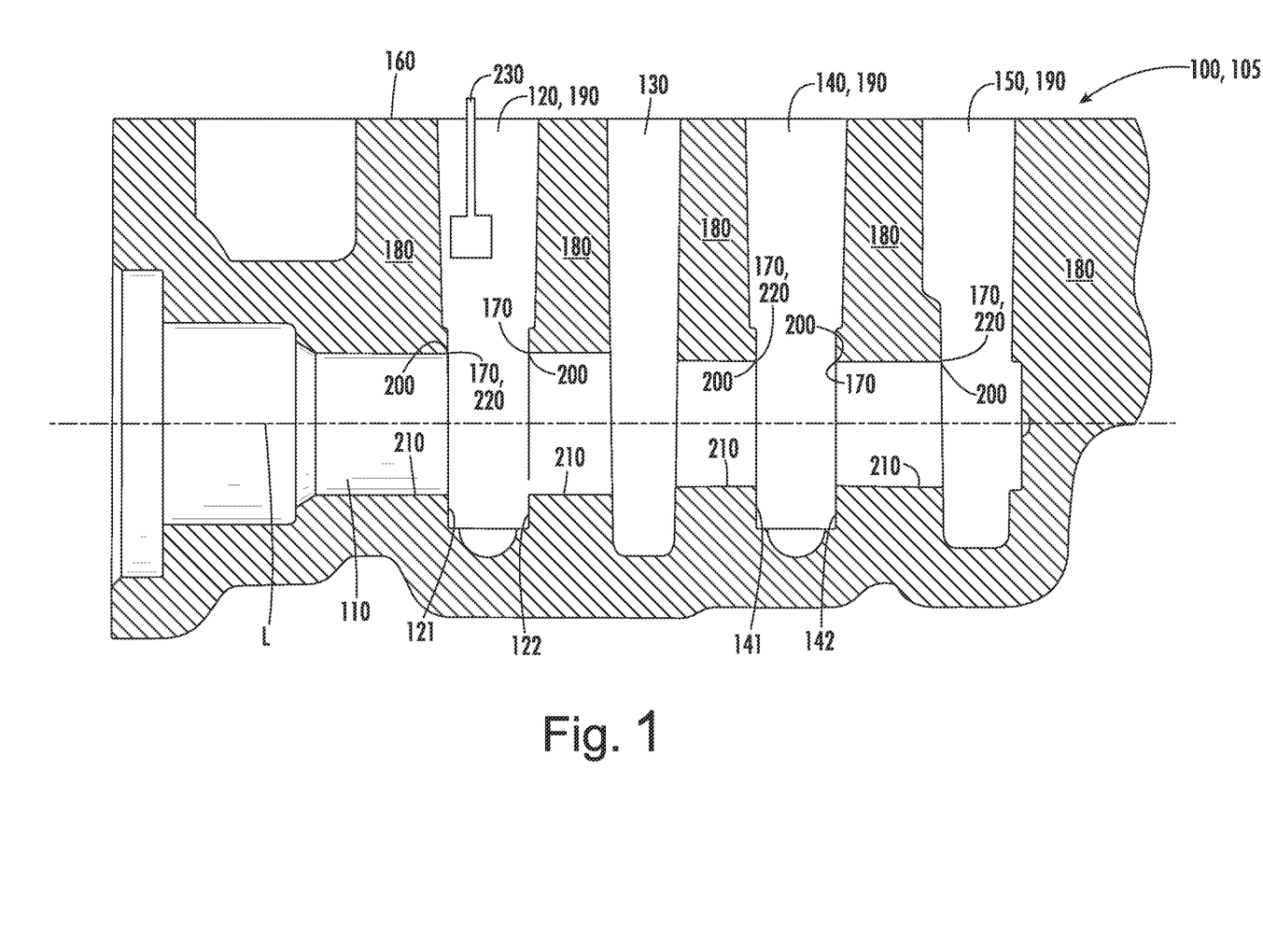
FIG. 1 shows, in a sectioning, a valve housing manufactured with the method according to according to example aspects of the invention.

In FIG. 1, in a sectioning, a base body 100 of a valve housing 105 is shown in sections. The base body 100 and/or the valve housing 105 form/forms a part of a hydraulic control valve (not represented) for a selector unit, for example, of an automatic transmission of a vehicle, in particular of a passenger car.

The base body 100 shown in FIG. 1 is made of aluminum casting and includes a valve spool chamber 110 designed as a blind hole, in which a valve spool (not represented) is mounted so as to be axially movable in a spool direction and/or longitudinal axis L, and multiple ports in the form of valve pockets 120, 130, 140, and 150. The bore hole and/or the valve spool chamber 110 extend/extends transversely through the valve pockets 120, 130, 140, and 150 (and/or the valve pockets 120, 130, 140, and 150 extend transversely with respect to the valve spool chamber 110) and include/includes multiple sections with different diameters. The reference character 160 relates to a flange face on a coupling side for connecting the valve housing 100, for example, to a control unit or the like. The lateral faces of the valve pockets 120, 130, 140, and 150 are designed as slopes, as explained at the outset. At least some of the circumferential edges between the valve spool chamber 110 and the valve pockets 120, 130, 140, and 150 function as control edges 170. Moreover, end faces (spot faces) 121, 131, 132, 151, and 152 are formed in the lateral faces around some control edges 170, which extend perpendicularly to the bore hole and/or longitudinal axis L and/or spool direction of the valve spool chamber 110. During the casting or die casting of the base body 100, the valve pockets 120, 130, 140, and 150 are essentially fully formed and the valve spool chamber 110 is preformed.

Between the valve pockets 120, 130, 140, and 150 and on the edge of the valve pocket 150 and 120, web sections 180 are formed out of the base body 100, wherein the web sections delimit the valve pockets 120, 130, 140, and 150 laterally and/or in the axial direction.

The web sections 180, which also include control edges 170, delimit valve pockets 120, 140, and 150, which are also referred to in the following as machining valve pockets 190. The web sections 180 that are adjacent to the machining valve pockets 190 include the control edges 170, which circumferentially extend around a web exit openings 200, respectively. The control edges 170 are each formed by a spool guiding section 210 and a front-side section 220. The front-side sections 220 extend in a radial plane with respect to the longitudinal axis L and/or the spool direction. The spool guiding sections 210 are hollow cylindrical sections and form a part of the valve spool chamber 110. The control edge 170 is formed, in each case, by the transition from the spool guiding section 210 to the front-side section 220 at the web exit opening 200.

The machining of the front-side section 220 takes place with the aid of a cutting process, wherein a cutting tool 230 is guided from an entry opening at the flange face 160 and/or coupling side of the base body 100 to the machining point in order to machine the front-side section 220. The cutting tool 230 is only symbolically represented in FIG. 1. Therefore, the cutting machining with the cutting tool 230 takes place with respect to the longitudinal axis L and/or the spool direction, wherein the cutting tool 230 is radially aligned. In particular, the removal of the material for producing the front-side section 220 takes place from the labyrinth side. The various front-side sections 220 can be machined one after the other or—as is explained in the following—machined in parallel at least in one common machining valve pocket 190.

Figure 2:
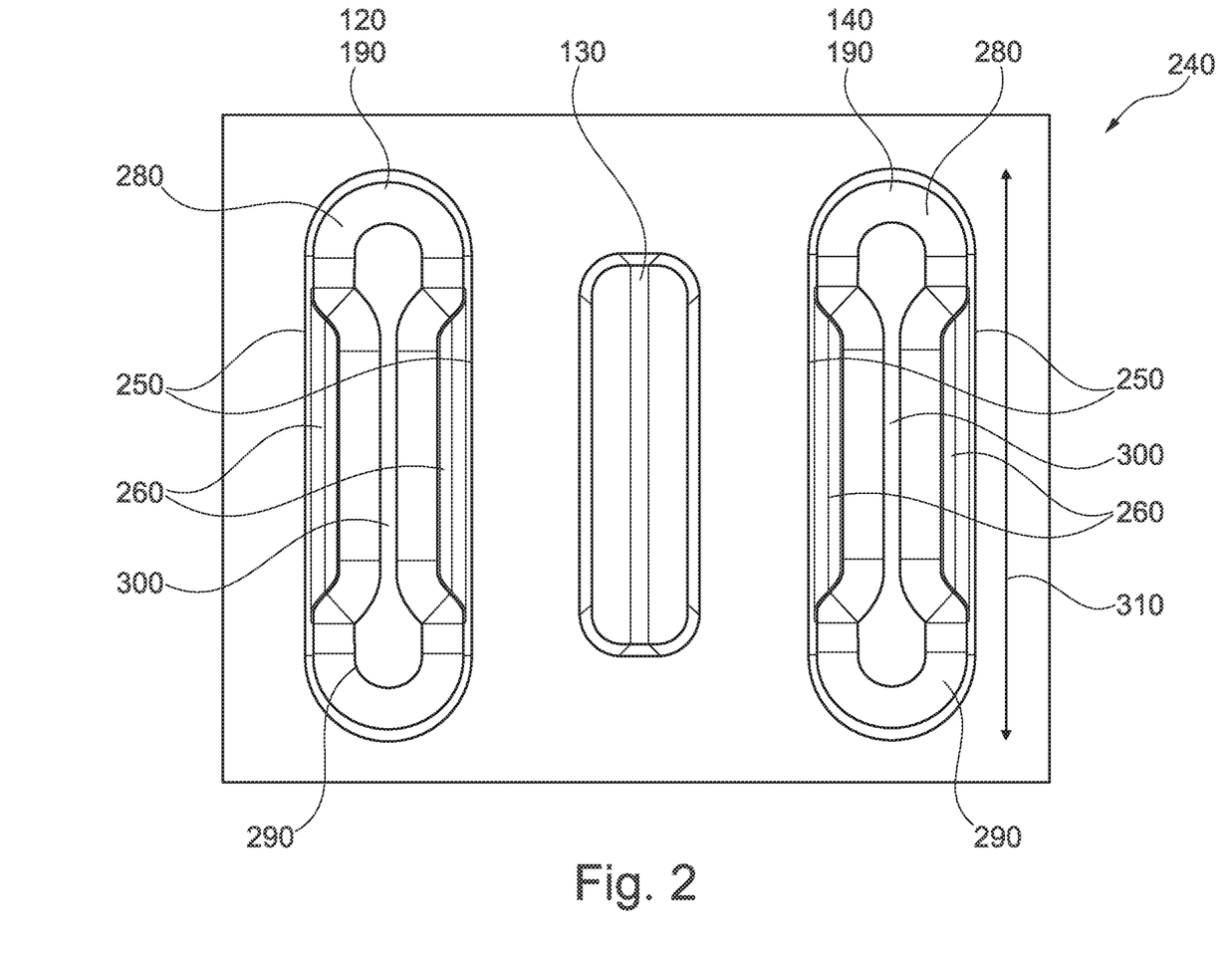
FIG. 2 shows, in a top view, a section of the valve housing from FIG. 1.

FIG. 2 shows an unmachined base body 240 for the base body 100 from the flange face 160 and/or from the coupling side in a section. In the top view, the already formed valve pockets 120, 130, and 140 are apparent.

Figure 3:
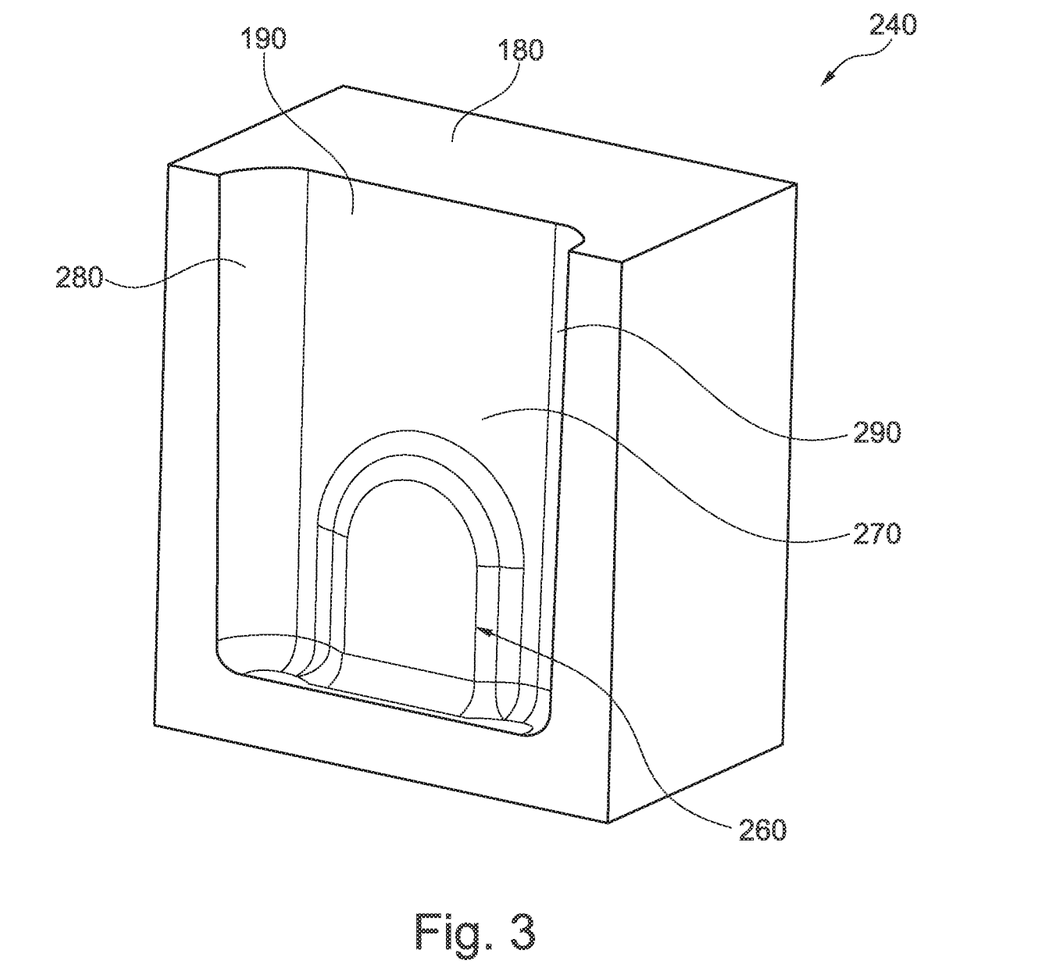
FIG. 3 shows, in a three-dimensional representation, a machining valve pocket of an unmachined body for a base body of the valve housing from FIGS. 1 and 2.

FIG. 3 shows a detail section of the unmachined base body 240 from one of the machining valve pockets 190. In this exemplary embodiment, open area for the valve spool chamber 110 has not yet been formed in the unmachined base body 240. The adjacent web wall section 180 provides a web wall area 250 (FIG. 2), wherein the web wall area 250 forms a lateral face in the machining valve pocket 190. The web wall area 250 includes an unmachined front-side section 260 and a residual web wall section 270. The unmachined front-side section 260 is designed as a draft, for example, with a draft angle of, for example, zero degrees, forty minutes (0° 40'), and is therefore pitched from the machining valve pocket 190 in the direction of the exit opening. The unmachined front-side section 260 has a semicircular shape, wherein the semicircle is aligned in the direction of the exit opening of the machining valve pocket 190 and adjoins an end at a base of the machining valve pocket 190. The unmachined front-side section 260 protrudes with respect to the residual web wall section 270.

In the cutting machining, the unmachined front-side section 260 is machined during the front-side machining step, and so the front-side section 220 with the end faces 121, 122, 141, 142 is formed.

In the exemplary embodiment in FIGS. 2 and 3, the cutting machining is implemented with the aid of a milling process, wherein a milling cutter, as the cutting tool 230, is inserted from the exit opening of the machining valve pocket 190. In order to minimize the amount of machining, the machining valve pocket 190 includes an entry open space 280 and an exit open space 290, which are designed as semicircular—in a top view—recesses extending in the longitudinal direction of the machining valve pocket 190 and are connected to each other via a machining channel, wherein the machining channel 300 is formed by between the web wall areas 250 of one of the machining valve pockets 190.

Figure 4:
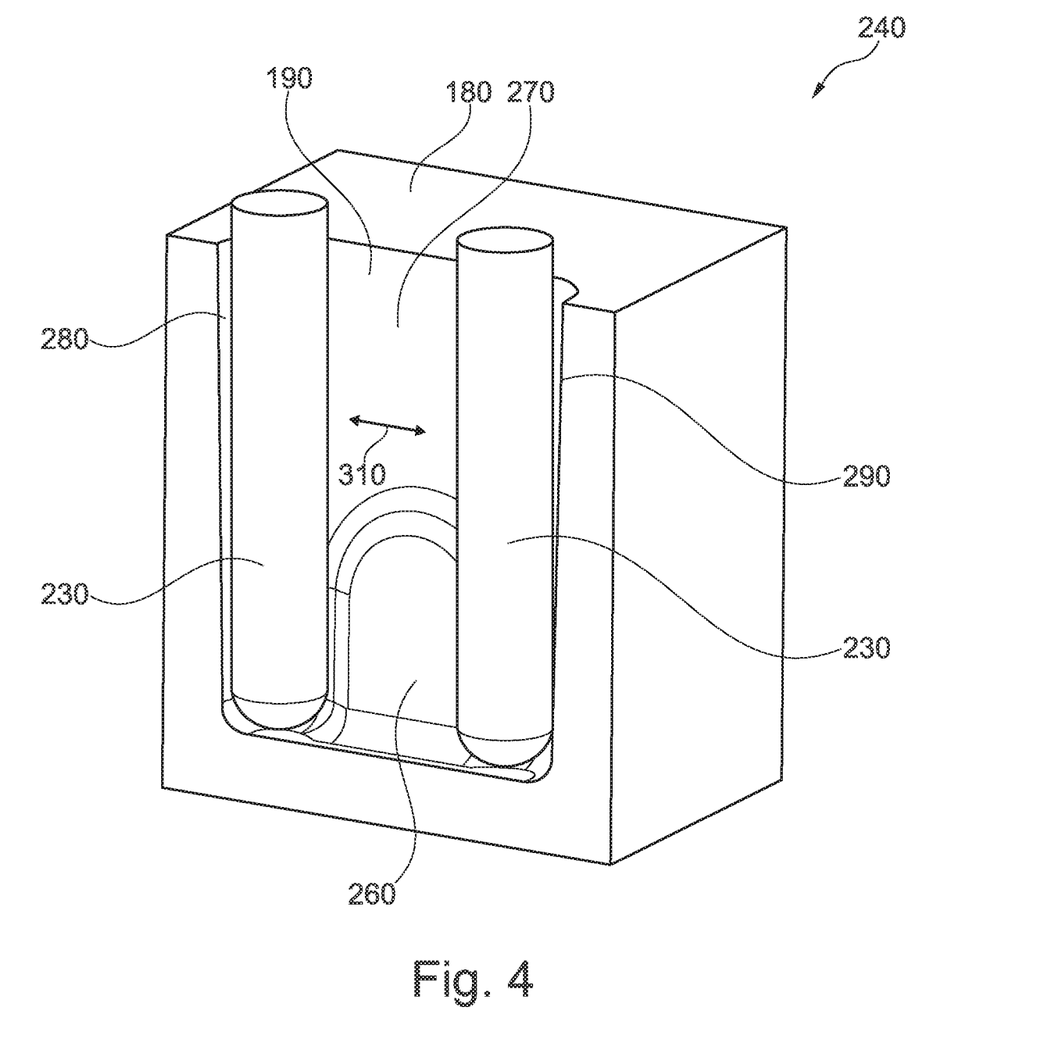
FIG. 4 shows the machining valve pocket during a milling operation.

In FIG. 4, the same machining valve pocket 190 is shown, wherein the cutting tool 230 is a milling cutter and is represented twice, namely once in the entry open space 280 and a second time in the outlet open space 290. The cutting process is carried out with the aid of a movement of the cutting tool 230 along the arrow 310, as represented in FIG. 2.

Figure 5:
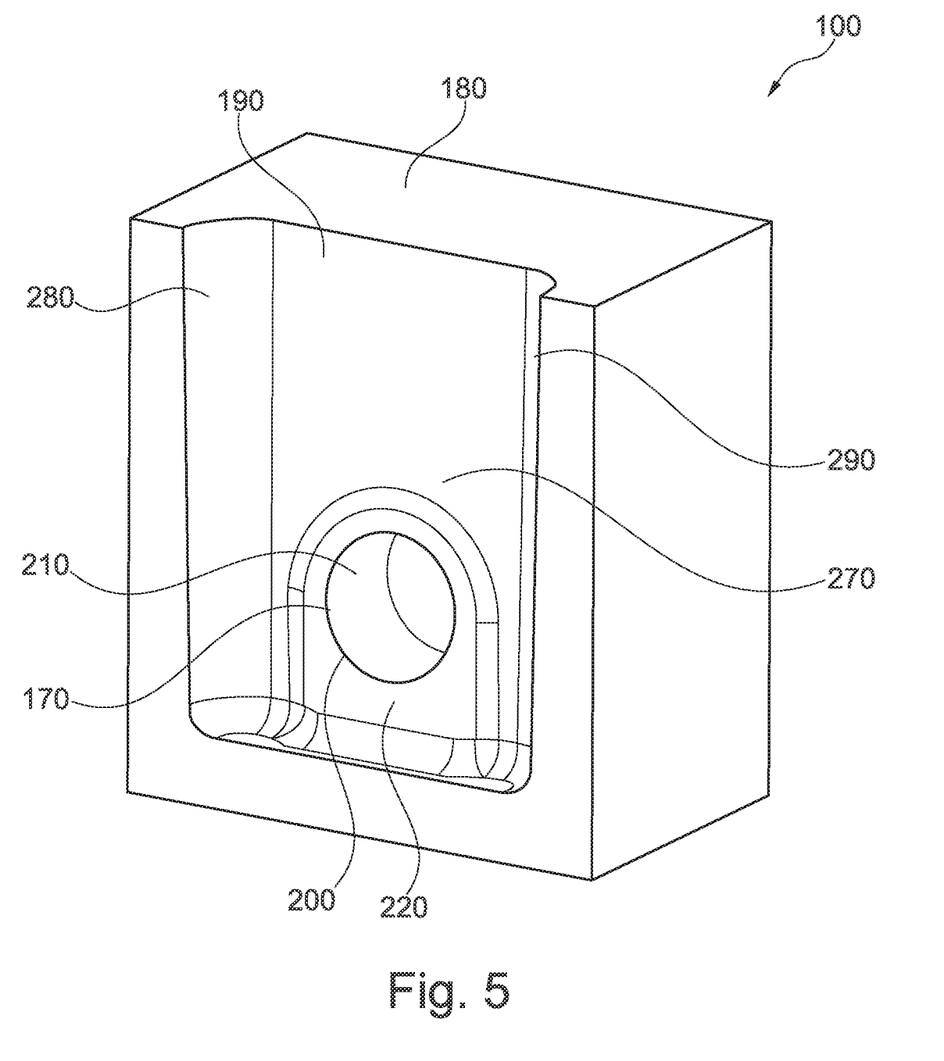
FIG. 5 shows the machining valve pocket after the machining.

FIG. 5 shows the same machining valve pocket 190, although in the fully machined base body 100, wherein the valve spool chamber 110 has also been introduced. It is apparent that, with the aid of the cutting machining in the front-side machining step, material has been removed preferably exclusively at the unmachined front-side section 260, in order to form the front-side section 220. The penetration of the valve spool chamber 110 can take place, in a first alternative, before the front-side machining step and, in a second alternative, after the front-side machining step.

Figure 6:
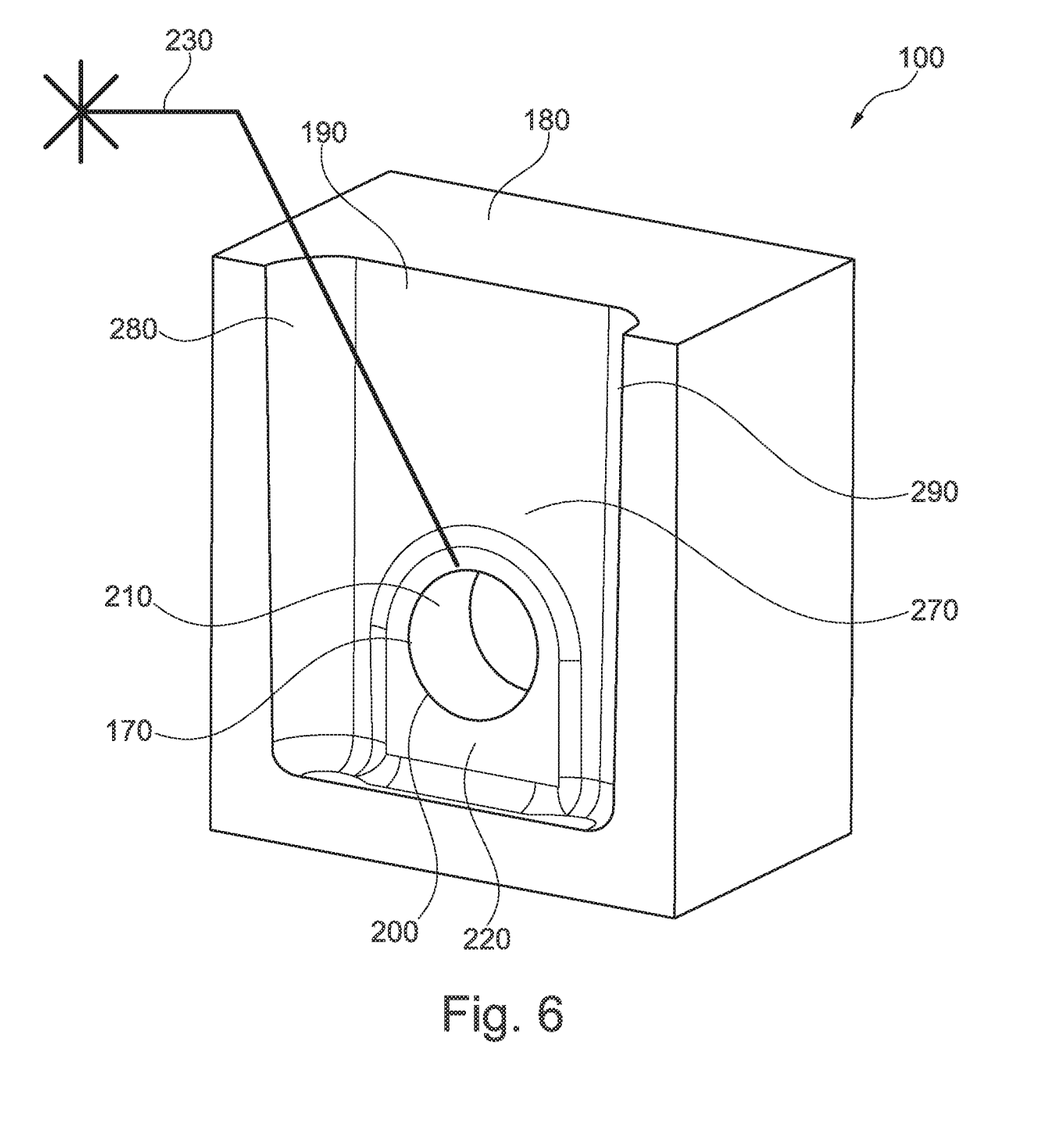
FIG. 6 shows the machining valve pocket from FIG. 3 during a laser material processing.

FIG. 6 visualizes an alternative method variant, wherein, instead of the milling cutter, a laser beam for a laser material processing is utilized as the cutting tool 230. The laser beam, as the cutting tool 230, is guided via the exit opening of the machining valve pocket 190 to the machining spot, in order to produce—starting from the unmachined front-side section 260—the front-side section 220 within the scope of the front-side machining step.

In other example embodiments of the invention, both cutting processes are utilized, so it is possible that the unmachined front-side section 260 is initially pre-machined via the laser material processing and is subsequently further or fully machined via the milling operation to form the front-side section 220.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 100 base body of a valve housing
105 valve housing
110 valve spool chamber (bore hole)
120 valve pocket
121 end face (spot face)
122 end face (spot face)
130 valve pocket
140 valve pocket
141 end face (spot face)
142 end face (spot face)
150 valve pocket
160 flange face
170 control edges
180 web sections
190 machining valve pocket
200 web exit opening
210 spool guiding section
220 front-side section
230 cutting tool
240 unmachined base body
250 web wall area
260 unmachined front-side section
270 residual web wall section
280 entry open space
290 exit open space
300 machining channel
310 arrow
L longitudinal axis

The invention claimed is:

1. A method for producing a base body (100) of a valve housing (105) for a hydraulic control valve, comprising:
providing a plurality of valve pockets (120, 130, 140, 150) in the base body (100) from a coupling side, the valve pockets (120, 130, 140, 150) configured for guiding a hydraulic fluid, the valve pockets (120, 130, 140, 150) delimited and/or separated from one another by web sections (180); and
providing a valve spool chamber (110) in the base body (100), the valve spool chamber (110) configured for receipt of a valve spool, the valve spool chamber (110) defining a longitudinal axis (L), the valve spool chamber (110) extending through at least one web section (180) to form a web exit opening (200), the web exit opening (200) opening into a machining valve pocket (190) of the valve pockets (120, 140), the web exit opening (200) circumferentially delimited by a control edge (170), the control edge (170) formed by a spool guiding section (210) and a front-side section (220),
wherein an unmachined base body (240) comprises a web wall area (250) in the machining valve pocket (190), the web wall area (250) comprises an unmachined front-side section (260) and a residual web wall section (270), and the unmachined front-side section (260) protrudes axially over the residual web wall section (270) with respect to a spool direction and/or the longitudinal axis (L),
wherein the front-side section (220) of the control edge (170) is machined into the unmachined base body (240) for the base body (100) with a cutting process during a front-side machining,
wherein the cutting tool (220) is guided from the coupling side through the machining valve pocket (190) to the front-side section (220) of the control edge (170) in the cutting process.

2. The method of claim 1, wherein the cutting process comprises a milling process, the cutting tool comprises a milling tool, and the milling tool is guided from the coupling side through the machining valve pocket (190) to the front-side section (220) of the control edge (170) in the milling process.

3. The method of claim 1, wherein the cutting process comprises a laser cutting process, the cutting tool comprises a laser beam, and the laser beam is guided from the coupling side through the machining valve pocket (190) to the front-side section (220) of the control edge (170) in the laser cutting process.

4. The method of claim 3, wherein the cutting process comprises a laser cutting process and a milling process, the method further comprising:
pre-machining with the aid of the milling process; and
finishing or re-working with the laser cutting process.

5. The method of claim 3, wherein the cutting process comprises a laser cutting process and a milling process, the method further comprising:
pre-machining with the laser cutting process; and
finishing or re-working with the milling process.

6. The method of claim 1, wherein:
the cutting process comprises a cylinder machining;
providing the valve spool chamber (110) comprises introducing and/or machining the valve spool chamber (110) into the unmachined base body (240); and
the cylinder machining is carried out before or after the front-side machining in order to produce the spool guiding section (210) of the control edge (170).

7. The method of claim 1, further comprising forming the unmachined base body (240) with a shaping process.

8. The method of claim 7, wherein the unmachined front-side section (260) is configured as a draft for the shaping process.

9. The method of claim 1, wherein the front-side section (220) extends radially with respect to a spool direction and/or the longitudinal axis (L).

10. A valve housing (105), comprising the base body (100) produced according to the method of claim 1.

11. A valve housing (105) for a hydraulic control valve, comprising:
a base body (100);
a plurality of valve pockets (13, 140, 150) formed in the base body (100) from a coupling side, the valve pockets (13, 140, 150) configured for guiding a hydraulic fluid, the valve pockets (13, 140, 150) delimited and/or separated from one another by web sections (180); and a valve spool chamber (110) formed in the base body (100), the valve spool chamber (110) configured for receipt of a valve spool, the valve spool chamber (110) defining a longitudinal axis (L), the valve spool chamber (110) extends through at least one web section (180) to form a web exit opening (200), the web exit opening (200) opening into a machining valve pocket (190) of the valve pockets (120, 140), the web exit opening (200) circumferentially delimited by a control edge (170), the control edge (170) formed by a spool guiding section (210) and a front-side section (220), wherein the front-side section (220) of the control edge (170) of the base body (100) is produced with a cutting process, and a cutting tool is guided from the coupling side through the machining valve pocket (190) to the front-side section (220) of the control edge (170) in the cutting process, and wherein the base body (240) comprises a web wall area (250) in the machining valve pocket (190), the web wall area (250) comprises a front-side section (260) and a residual web wall section (270), and the front-side section (260) protrudes axially over the residual web wall section (270) with respect to a spool direction and/or the longitudinal axis (L).

* * * * *